May 26, 1936.  W. HAGENBUCH  2,042,150
APPARATUS FOR AND PROCESS OF FRACTIONATION
Filed Dec. 1, 1930
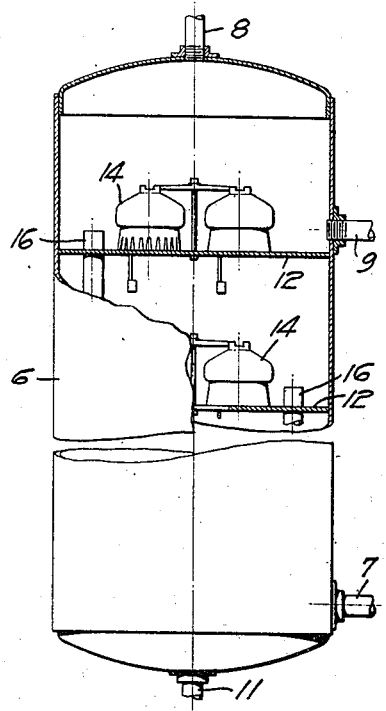
FIG_1_
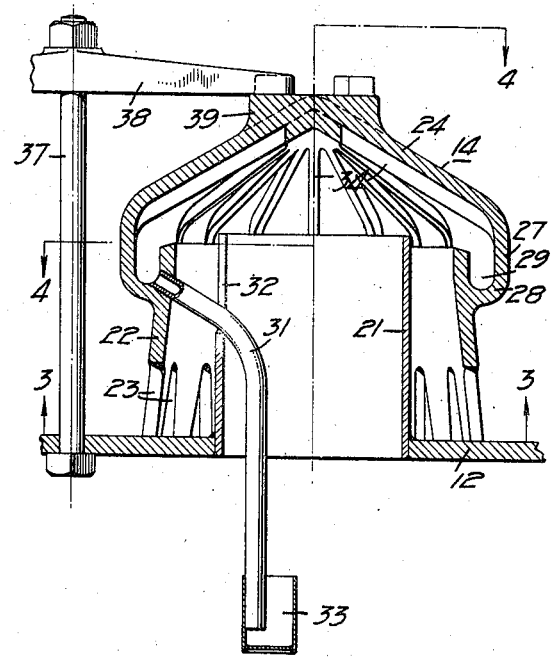
FIG_2_
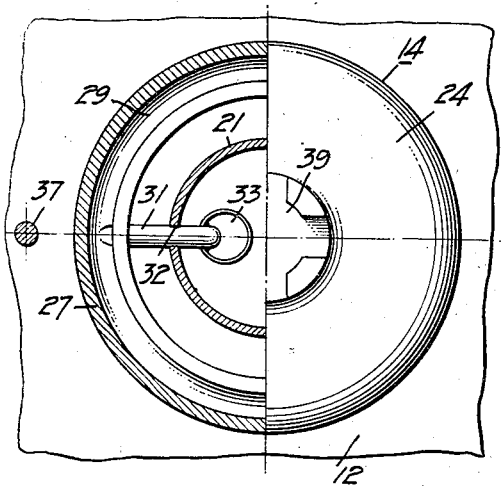
FIG_4_
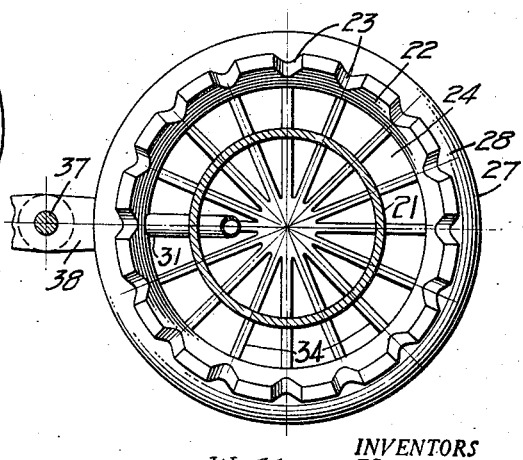
FIG_3_
INVENTORS
Walter Hagenbuch
BY
ATTORNEY Patented May 26, 1936

2,042,150

UNITED STATES PATENT OFFICE 2,042,150

APPARATUS FOR AND PROCESS OF FRACTIONATION

Walter Hagenbuch, Martinez, Calif., assignor to Shell Development Company, San Francisco, Calif., a corporation of Delaware Application December 1, 1930, Serial No. 499,291

7 Claims. (Cl. 261—114)

This invention relates to the fractionation of gases or vapors whereby these are bubbled through layers of liquid and consists in an improvement in the bubble caps used in fractionating towers. Under fractionating tower I include for simplicity all towers of the bubble plate type used for related purposes, as for fractionation, rectification, absorption, scrubbing, etc.

It has been observed that the efficiency of such towers is greatly reduced by the contamination of the liquid upon the plates with liquid from lower plates carried up by the ascending gas or vapor as mist or spray. It has been proposed to eliminate this mist or spray by devices inserted between the plates in the vapor zone of the interplate chambers. However, these devices have the disadvantage of unfavorably affecting the vapor velocity through the tower besides being complicated to install.

It is the object of my invention to provide an efficient process of fractionation, which may be accomplished by improving the usual bubble cap design in such manner as to have the cap itself serve the purpose of mist extractor, which simplifies greatly the design and construction of these bubble towers. For this purpose I incorporate in the cap itself means to arrest the spray or mist suspended in the ascending gas or vapor.

It is a further object of my invention to collect the arrested mist or spray and return the liquid collected to the plate or chamber from which the vapor, which entrained it, ascended.

By means of my invention the vapor on its contact with the liquid upon a plate is substantially free from liquid entrained from the next lower plate, which makes a closer fractionation possible and increases the efficiency of each plate.

The separation of the spray, mist or liquid from the ascending vapor is, in the present invention, accomplished by relatively simple means which are easy and cheap to manufacture and which desirably affect the engineering design of a fractionating column. Thus, the bubble cap means devised by me enables the size of the column to be decreased while ensuring the same or an increased efficiency of operation compared to previous towers. Further, the bubble cap of my invention can be readily installed in existing plate towers and is particularly desirable upon those plates in the towers immediately below the point where an end point material is to be drawn off and at which point, of course, the liquid spray is most detrimental.

By employing the improved bubble cap of my invention the capacity of a fractionating column or tower can be increased since the vapor velocity can be carried to a much higher rate with the same degree of efficiency or with an increased efficiency, since the extraction of the mist within each of the bubble caps enables an increased degree of fractionating efficiency to be secured.

My invention possesses other advantageous features and objects, some of which with the foregoing will be set forth at length in the following specification in which I have outlined the preferred form of the bubble cap of my invention. It is to be understood that the bubble cap may be embodied in other forms without departing from the spirit of my invention, within the scope of the appended claims.

In the drawing, Fig. 1 is a diagrammatic view partly in section of a fractionating tower of the plate type in which bubble caps of my invention have been installed.

Fig. 2 is an enlarged vertical sectional view of a bubble cap of my invention.

Fig. 3 is a section on the line 3—3 of Fig. 2.

Fig. 4 is a section taken along the line of 4—4 of Fig. 2.

My invention may be briefly characterized as comprising a bubble cap by means of which the liquid carried by the gas ascending thru the fractionating tower is so handled and treated that the spray, mist or liquid carried in the ascending vapor is separated out so that the gas is substantially free therefrom and passes on into the next interplate zone or chamber without contaminating the liquid therein. Referring particularly to Fig. 1, a fractionating tower 6 is diagrammatically shown as provided with a vapor inlet 7, vapor outlet 8, and liquid inlet 9 and a liquid outlet 11, which may lead to the usual kettle at the bottom and reflux condenser at the top, not shown.

Positioned within the tower and adapted to enable a fractionating contact to be secured between the oil and gas are a plurality of plates 12. The number of these plates, of course, depends upon the degree and efficiency of fractionation desired. Each of the plates is provided with a number of bubble caps generally designated as 14 which caps are designed to bring the liquid upon each of the plates and the ascending vapor or gas into contact. The number of bubble caps provided upon each of the fractionating plates can be varied, depending upon the capacity and other factors entering into the design of the tower. A quantity of liquid is maintained upon each of the plates by means of having the down pipes 16 extend above each plate a certain distance so that a predetermined liquid height is preserved.

Each of the bubble caps includes a riser 21 which normally extends up above the level of the down pipe 16 and which is secured to the plate 12 as by welding. In accordance with my invention a bubble cap of a particular design is positioned over each of the risers to effect separation of the mist, vapor or spray carried in the ascending gas so that the gas which contacts with the liquid on the plate is substantially free from the liquid component of the plate below. This is accomplished by the bubble cap itself without the provision of other means in the interplate chamber or zone. I have found that a bubble cap having a base 22 generally circular in outline and apertured or notched as at 23 to admit gas from the riser to the interplate zone is preferably provided. The apertures may take any convenient form but I have found that a plurality of slots is an effective one; the top of the slots should be kept below the usual liquid level on the plate. The bubble cap also includes a cover portion 24 conveniently formed integral with the base as by casting the whole structure integrally as from cast iron or other suitable material depending upon the character of the gas and liquid to be handled. The cover portion is generally conical in shape, converging to a point which is positioned centrally above the riser so that ascending vapor is deflected substantially equally to the whole circumference of the bubble cap. The conical shape of the cover in my improved bubble cap should be such as to avoid a streamline effect in conducting the vapors and to deflect them as sharply as possible from their course to obtain the best possible precipitation by the sudden change of direction.

In accordance with my invention, means are provided, preferably at the outer portions of the cover 24 to collect and return the separated liquid, mist or spray to the plate below so that a contamination of the liquid on the plate on which the bubble cap is positioned does not take place. This means is conveniently formed by a wall 27 which extends vertically between the cover 24 and an intermediate portion 28 of the base 22 so that a trough 29 is provided in which the separated liquid, spray or mist is collected. The angle of the conical cover is preferably so taken that the precipitated liquid will readily flow down into the trough; I prefer to have it not less than 30° to the horizontal. A drain 31 is provided for the trough as a pipe which is screwed into the cap and extends thru a slot 32 in the riser down toward the lower plate. This slot 32 may be closed by a small plate welded to the top of the drain pipe only. I have found it desirable to provide a liquid seal by affixing a small cup 33 to the drain so that vapor cannot rise up through the drain.

Means are also provided upon the cover plate for promoting precipitation on the underside of the cover and for conveying precipitated liquid to the trough. These means preferably comprise a plurality of vanes 34, some of which extend from the peak of the cover portion to the trough.

In installing the bubble caps on the plate, a plurality of the caps are conveniently secured in place as by providing a bolt 37 having an arm 38, which is adapted to be positioned between adjacent bubble caps in engagement with a boss 39 provided thereon so that the caps are secured in position over the risers.

By using the bubble cap of my invention, or such modifications thereof as will suggest themselves to those skilled in the art upon their knowledge of my invention, the capacity of fractionating is increased because they allow increase in the gas velocity with the same or better fractionation.

I claim as my invention:

1. In a process of fractionation by means of a column provided with bubble plates for maintaining pools of liquid, wherein vapors containing entrained liquid rise through the plates, the steps which comprise directing substantially straight line streams of said rising vapors with entrained liquid through a plate, sharply reversing the upward flow of vapors, thereby separating the entrained liquid from the vapors without condensing any substantial portion of the vapors, collecting and withdrawing the separated liquid and contacting the resulting vapors with the liquid on the plate.

2. In a process of fractionation by means of a column provided with bubble plates for maintaining pools of liquid, wherein vapors containing entrained liquid rise through the plates, the steps which comprise directing substantially straight line streams of said rising vapors with entrained liquid through a plate, sharply reversing the upward flow of vapors, thereby separating the entrained liquid from the vapors without condensing any substantial portion of the vapors, contacting the resulting vapors with the liquid on the plate, collecting the separated liquid and returning it to the space under the plate.

3. In a process of fractionation by means of a column provided with bubble plates for maintaining pools of liquid, wherein vapors containing entrained liquid rise through the plates, the steps which comprise directing substantially straight line streams of said rising vapors with entrained liquid through a plate, sharply reversing the upward flow of vapors, thereby separating the entrained liquid from the vapors without condensing any substantial portion of the vapors, contacting the resulting vapors with the liquid on the plate, collecting the separated liquid and returning it to the space under the plate in a stream protected from the contact with the vapors rising through the plate.

4. Apparatus of the character described comprising a tower, fractionating plates spaced from each other therein, a gas passage through said plates, a cap partially enclosing said passage, a pocket formed in said cap and an area on said cap leading to said pocket for changing the direction of gas flow and for draining into said pocket the liquid particles entrained by the gas passing through said passage and impinged upon said area by the action of centrifugal force.

5. Apparatus of the character described comprising a tower, fractionating plates spaced from each other in said tower, said plates formed with a gas passage therethrough, a sheet metal cap positioned directly opposite said passage, the edges of said cap being bent upwardly to form pockets, and means on the interior of said cap adapted to drain entrained liquid particles into said pockets impinged against said means by the centrifugal action of gas flowing through said passage.

6. In a fractionating tower having fractionating plates spaced from each other, gas passages through each plate, a riser fitted in each passage, a cap arranged directly opposite each riser, the edges of said cap being bent upwardly to form pockets, means on the interior of said cap adapted to direct into said pockets entrained liquid particles impinged against said means by the centrifugal action of the gas flowing through said riser, and a closed conduit to drain the liquid accumulating in said pockets to the next lower plate, said conduit passing within the riser.

7. In the apparatus of claim 1, liquid seal means to prevent an upward flow of vapors through the draining conduit.

WALTER HAGENBUCH.